United States Patent [19]

Moore

[11] 3,806,885

[45] Apr. 23, 1974

[54] POLLING MECHANISM FOR TRANSFERRING CONTROL FROM ONE DATA PROCESSING SYSTEM OR SUBSYSTEM TO ANOTHER

[75] Inventor: Brian B. Moore, Syracuse, N.Y.

[73] Assignee: International Business Machines Corporation, Armonk, N.Y.

[22] Filed: Dec. 29, 1972

[21] Appl. No.: 319,430

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,336,582 | 12/1967 | Beausoleil et al. | 340/172.5 |
| 3,473,155 | 10/1969 | Couleur et al. | 340/172.5 |
| 3,623,022 | 11/1971 | Day | 340/172.5 |
| 3,633,169 | 1/1972 | Bickford | 340/172.5 |
| 3,680,053 | 7/1972 | Cotton et al. | 340/172.5 |
| 3,706,974 | 12/1972 | Patrick et al. | 340/172.5 |
| 3,716,837 | 2/1973 | Waddell | 340/172.5 |

*Primary Examiner*—Paul J. Henon
*Assistant Examiner*—Michael Sachs
*Attorney, Agent, or Firm*—Owen L. Lamb

[57] ABSTRACT

A polling mechanism for use with apparatus for establishing and maintaining communication between a number of different types of subsystems. The apparatus includes a select line which interconnects all of the units in a closed loop. Control logic is provided at each unit in series with the select line. A bi-directional deselect line is provided interconnecting all of the units. A unit which has the poll (master unit) passes the poll by energizing the select line. A unit which does not wish to obtain the poll and thereby become the master unit, energizes the select line to the next unit in series in response to energization of the select line from the master unit. A unit obtains the poll (and becomes the master unit) by not energizing the select line to a next unit but by energizing the deselect which indicates to all units that the poll has been accepted.

A request line is provided interconnecting all of the units so that any unit can indicate that it would like to obtain the poll. The unit which has the poll passes the poll by raising the select line but if it wishes to retain the poll, it need not initiate a poll transfer. To provide for the situation where a unit has an urgent need for the poll, there is an urgent request line which a requesting unit can raise. The unit which has the poll will then pass the poll to the requesting unit provided it also does not have an urgent need for the poll.

7 Claims, 5 Drawing Figures

POLLING (CONTINUED)

POLLING MECHANISM FOR TRANSFERRING CONTROL FROM ONE DATA PROCESSING SYSTEM OR SUBSYSTEM TO ANOTHER

CROSS REFERENCE TO RELATED APPLICATION

U.S. Pat. application Ser. No. 319,958 filed Dec. 29, 1972 entitled "Communication Mechanism For Data Transfer And Control Between Data Processing Systems And Subsystems" by B. B. Moore and C. A. Thorn.

FIELD OF THE INVENTION

The invention relates to data processing systems and more particularly to apparatus for transferring control between subsystem elements. In prior systems such as that described in U.S. Pat. No. 3,336,582, "Interlocked Communication System", filed Sept. 1, 1964, means are provided for polling input/output control units attached to a data channel. This is accomplished by means of a select out line which passes from the channel to the first control unit, thence to the second control unit and to other control units in descending order of priority. Control units are interrogated to see if they need service by raising a select out line. If a control unit does not need service, it propagates the select out line to the next control unit. When a control unit desires to become selected, it raises an operational in line which signals to the channel that this control unit is selected. At the same time, it supresses the propagation of select out to the next terminal down the line.

This type of polling arrangement requires that one of the units always be the master unit and the other unit must be the slave unit. The master unit, in this case, is always the data channel and the slave units are the input/output control units. It is not possible for one of the control units to become the master for any period of time nor it is possible to pass the poll so any of the other units can be the one that initiates the polling operation.

SUMMARY OF THE INVENTION

It is primary object of this invention to provide a polling mechanism for interconnected subsystems in which any subsystem can become the master control unit.

It is a further object of this invention to provide a polling mechanism between subsystems which provides for a variable home position for the poll.

A further object of this invention is to provide a polling mechanism which is usable in a multiprocessing environment.

A further object of the invention is to provide a polling mechanism between subsystem elements in which a permanent "master-slave relationship" may selectively exist or not exist depending upon the requirements of the subsystem.

A further object of the invention is to provide a polling mechanism which has the capability of handling urgent poll requests thereby overriding polling requests of a lesser priority.

A further object of the invention is to provide an interface in which units attached thereto are all potentially equal with respect to a polling mechanism which is logically circular and not supervised or controlled by any one unit all of the time.

The above objects are accomplished in accordance with the inveniton by providing a select out line which interconnects all of the units in a closed loop. Each unit contains control logic which is connected in series with the select out line. The units are attached in a multidrop manner such that units down the line have a decreasing order of priority.

A deselect line is provided which is bi-directional and which connects all of the units in parallel. The control logic includes means for passing the poll by energizing the select line to the next unit in series whenever the select line is raised at the input to a unit. The logic also has means for accepting the poll by energizing the deselect line to indicate that the poll is being accepted and for inhibiting the passing of the select line to the next unit in series thereby allowing a unit to take the poll. The unit can then initiate the necessary control transfer and data transfer sequences for communication with any of the other subsystems.

In accordance with one aspect of the invention, a poll request line is provided connecting all the units in parallel, so that any unit may request the poll from a unit which has it.

In accordance with one aspect of the invention, an urgent poll request mechanism is provided by an urgent poll request line which is connected in parallel with all of the units. A unit requiring the poll raises the urgent poll request line and, even if a unit has the poll, it will transfer the poll to the requesting unit unless the unit having the poll also has an urgent request for the poll.

The invention has the advantage that a unit may hold on to the poll so long as no other unit needs the communication channel for communication purposes and therefore, the poll remains in a home position.

The invention has the further advantage of placing communication activities on a priority basis so that data transfers by high speed devices may have priority over low speed data transfers, controls transfers, and I/O interrupts through use of the urgent poll request line.

The invention has the further advantage that poll requests are separated into different categories depending upon the urgency of the request.

DESCRIPTION OF THE DRAWINGS

FIG. 1 is a schematic drawing showing interconnections of control adapter 0, 1 and 2 in which the invention is embodied;

DETAILED DESCRIPTION

Figure 4:
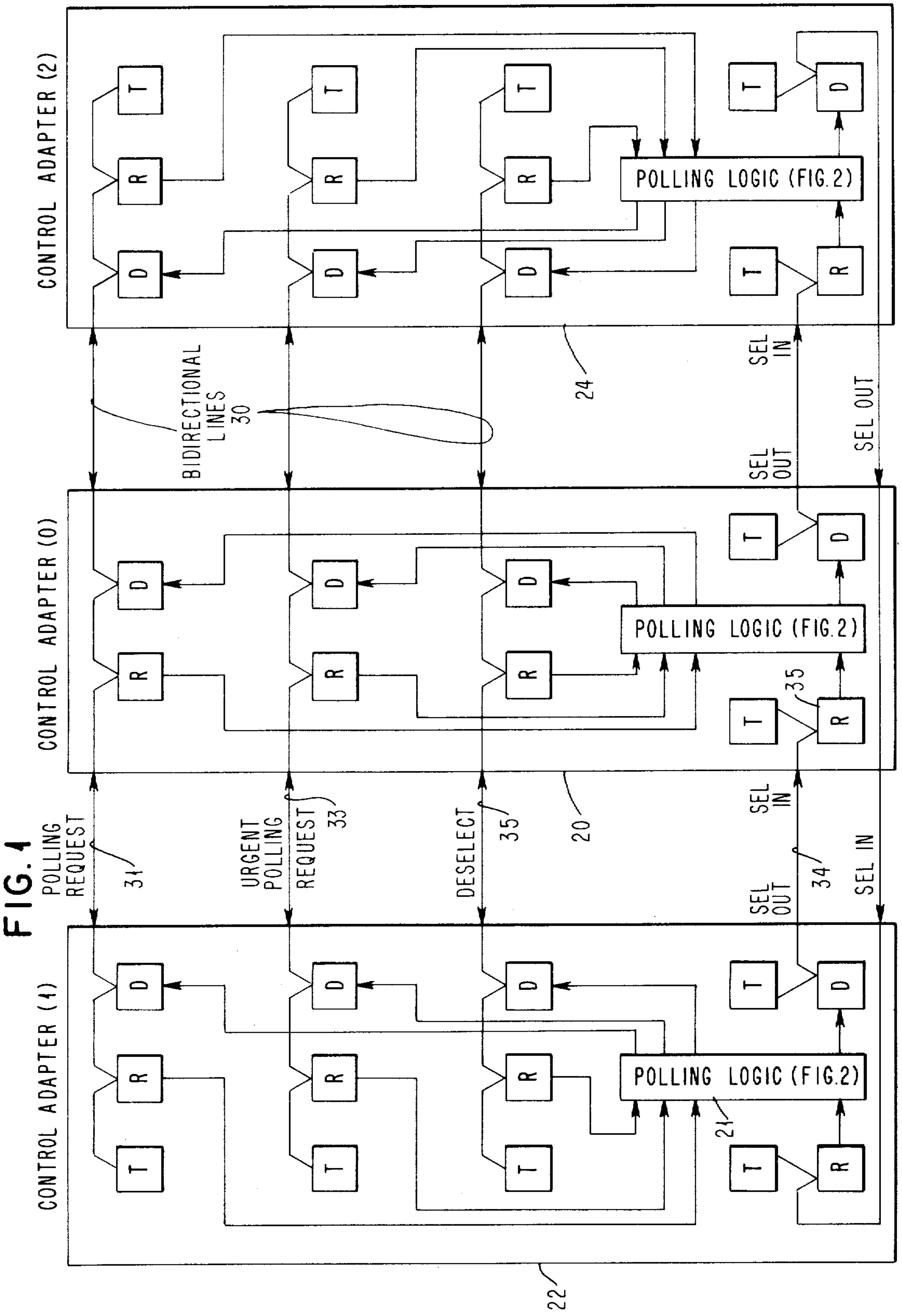
FIGS. 4 and 5 comprise a flowchart of a polling sequence.

FIG. 1 illustrates the connection of polling lines between control adapters. The blocks labelled T in FIG. 1 are terminators, typically characteristic impedance networks. The lines labelled D are drivers for converting voltage levels to voltage levels appropriate to the interface lines. The blocks labelled R are receivers for converting the voltage levels of the lines to voltage levels which are appropriate to the internal logic. These connections are more fully described in the above-identified Beausoleil et al. patent. Bi-directional lines 30 are utilized to send control information from one unit to the other or to receive control information back on the same wire. These lines include the polling request line 31 and the urgent polling request line 33 and the deselect line 35.

The select lines 34 are polling lines. These lines thread through each control adapter and back to the first adapter. Briefly, selection is accomplished in the following manner. Assume that unit 1 has the poll. if unit 0 requests the poll by raising polling request or urgent polling request (or if unit 1 decides to pass the poll), then unit 1 raises its select out line 34. The select out signal propagates across the wire in the interface to unit 0 which receives it as select in through the receiver 35. If unit 0 wants the poll, it does not allow this signal to pass through the unit and therefore, inhibits select out from rising. Control adapter 0 responds by raising the deselect lines 35 which signals to unit 1 that unit 0 has taken the poll. The polling sequence at this point is completed.

If unit 1 had the poll and unit 2 requests the poll (by raising polling request), then unit 1 raises select out. The select out signal propagates across the interface wire to unit 0 which receives it as select in. Since unit 0 does not want the poll, it raises select out and that select out signal propagates across the interface to unit 2 which receives the signal as select in. Since unit 2 wants the poll, it raises deselect and the sequence is completed.

The lines in the polling group are used to allocate control of the control interface which is more fully described in Section 5.2.1 of the above identified Moore et al. patent application. With this interface, all units attached to the interface by means of control adapters are potentially equal. Consequently, no unit may assume permanent control of the interface. Furthermore, interface polling is logically circular, that is, if there are three attached units, the first unit passes the poll to the second, the second through the third, and the third back to the first.

For a given unit, the next unit in line is the unit to which it passes the poll. The preceding unit is the unit which passes the poll to the given unit. A unit has the poll when it accepts the poll from the preceding unit. A unit may not initiate a control transfer sequence unless it has the poll.

Three control operations are performed over the control interface: polling, control transfer, and reset. As described more fully in Section 5.2 of the above identified Moore et al. application, the control interface lines are separated into two groups: information sources comprising the general bus and the unit active lines and the tag lines comprising control, latch control, proceed and stop.

When a subsystem is involved in one of the communication sequences, it sends information on one or more of the information sources. A subsystem may communicate only when it has acquired the poll and therefore has become the master unit.

The polling sequence is used at the control interface when the control interface is not being used for any interunit communication. The poll can be requested by any unit, but the polling sequence cannot be initiated by a unit which does not already have the poll. The polling sequence begins when the unit having the poll decides to pass the poll to a requesting unit. The unit may not pass the poll until all previously initiated polling, control transfer, and reset sequences have been completed.

Figure 2:
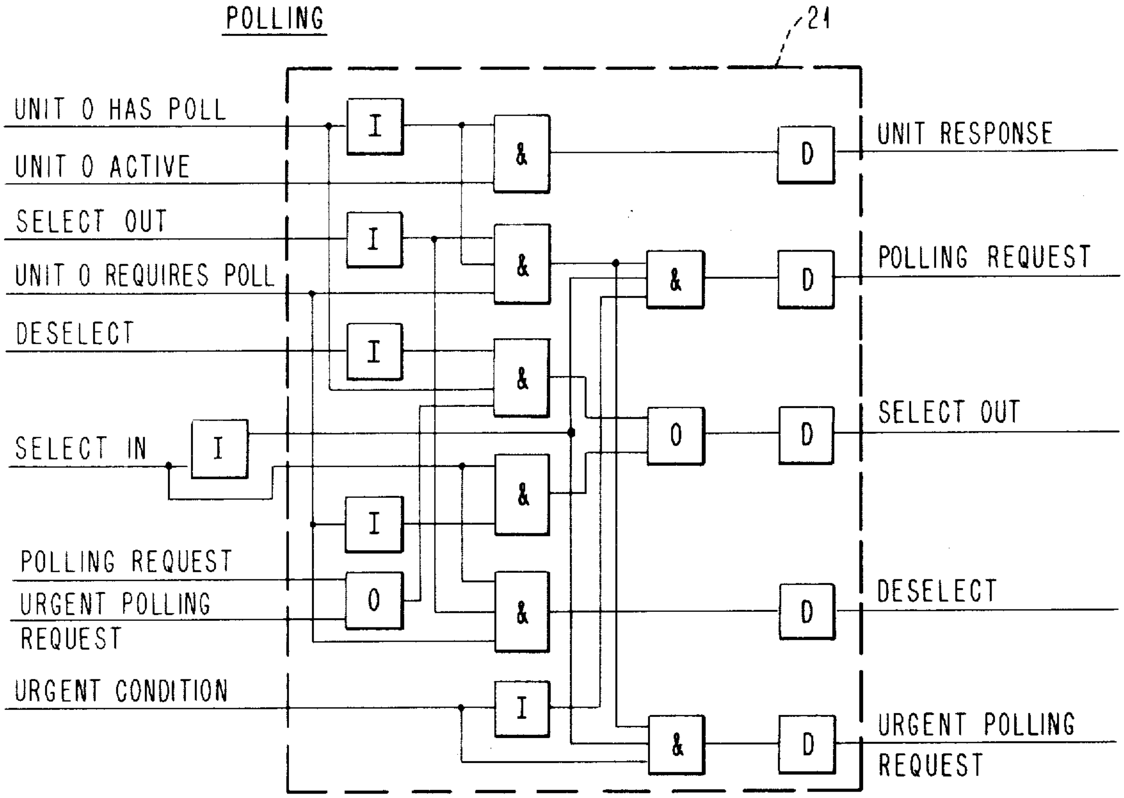
FIG. 2 is a block diagram of the logic within each control adapter shown in FIG. 1.
Figure 3:
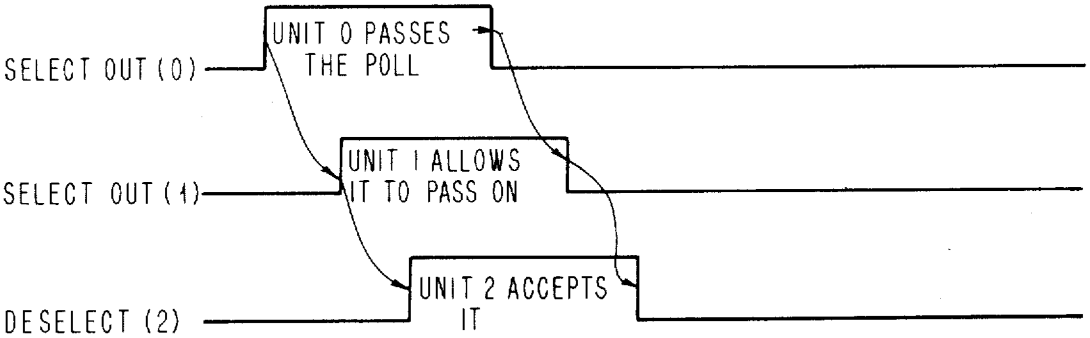
FIG. 3 is a timing diagram showing a polling sequence.
Figure 4:
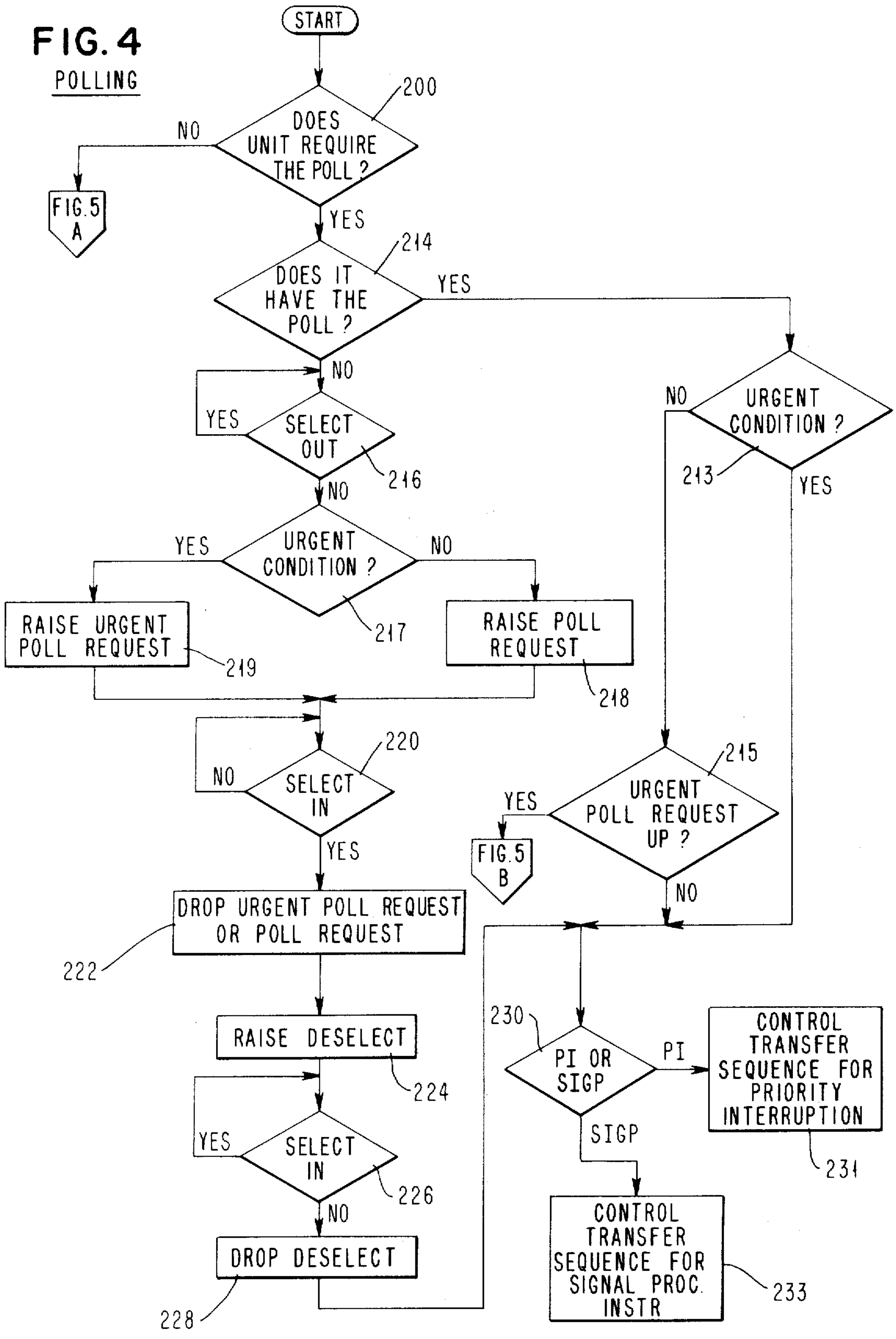
Figure 5:
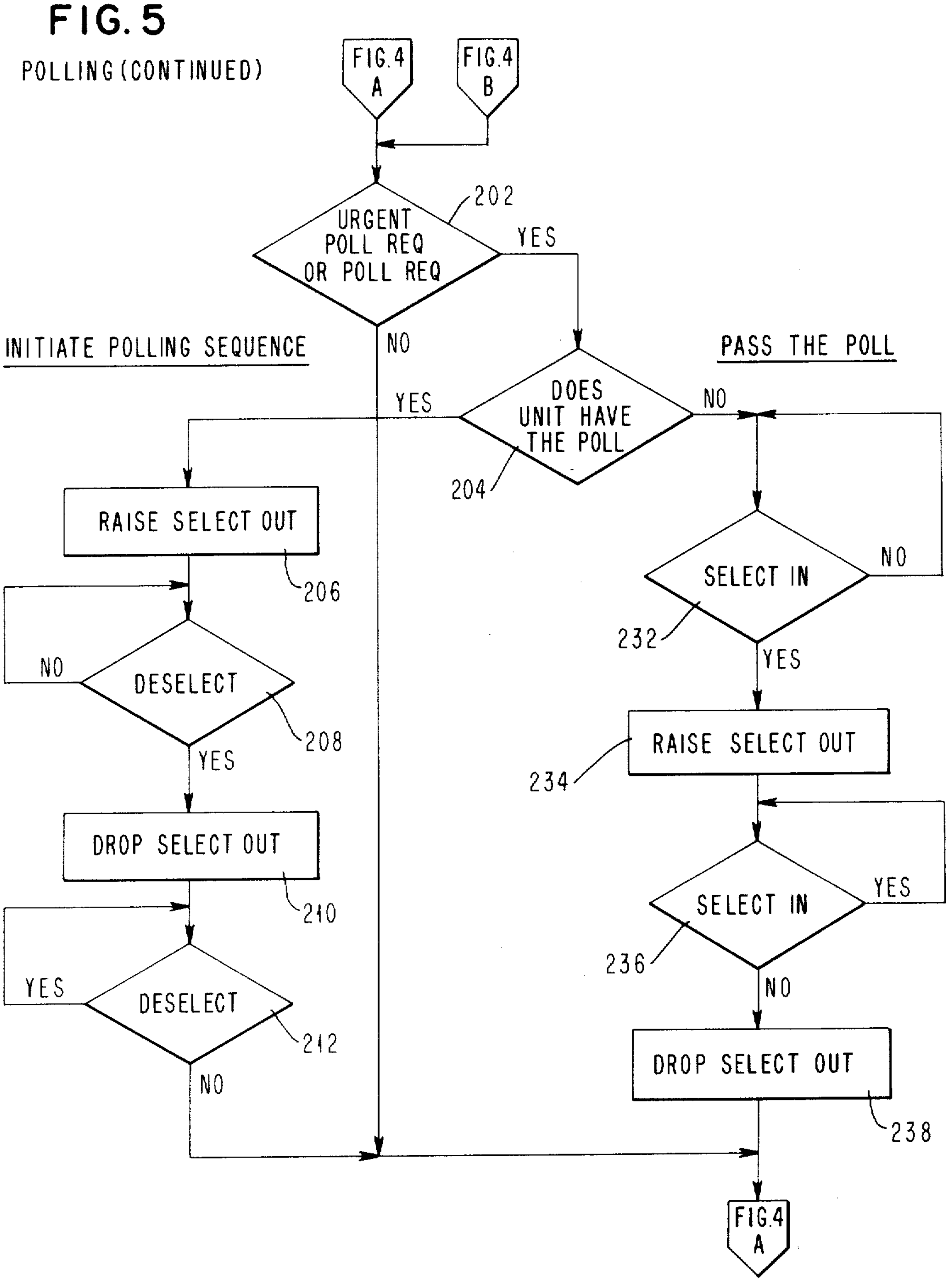

The polling logic at the control interface is shown in FIG. 2 and its operation is shown in detail in the form of logic diagrams, FIGS. 4 and 5. Off page connectors are used in FIGS. 4 and 5. For example, the connector labelled "FIG. 5A" connects to the connector labelled "FIG. 4A" on FIG. 5. A timing diagram for the polling sequence is shown in FIG. 3.

Referring to FIG. 4, decision block 200 decides whether or not the unit requires the poll. If the unit does not require the poll, the decision is no and the flow continues at FIG. 5.

In decision block 202 (FIG. 5), a determination is made to see if the poll request line from another unit is energized. If yes, decision block 204 decides whether or not the unit already has the poll. Only a unit which has the poll can initiate a polling sequence. If the unit has the poll, the unit initiates a polling sequence by raising its select out line block 206. This timing is shown in FIG. 3. The signal on this line becomes the select in signal to the next control adapter. The unit passes the poll and no longer has the poll when it raises its select out line. A unit, such as unit 1, receiving a signal on its select in line may either accept the poll or pass it along to the next unit in line. In the diagram of FIG. 3 it is assumed that unit 1 allows the poll to pass on to unit number 2. Unit number 2 accepts the poll, if needed, and initiates a control transfer sequence on the control interface. Unit 2 accepts the poll by raising its deselect line in response to the rise of select in. As shown in FIG. 3, unit 1 can drop its select out line as soon as the select out line from unit 0 has dropped. Unit 2 drops its deselect line whenever the select out line from unit number 1 has dropped. Thus, complete interlocking is maintained on the interface.

A unit has the poll as soon as its deselect line rises. The rise of deselect is determined at decision block 208 in FIG. 5. As soon as deselect rises, the initiating unit drops its select out signal, block 210, within a fixed delay, for example, 80 nanoseconds from the rise of deselect.

The accepting unit drops deselect within 80 nanoseconds of the fall of the select in signal, i.e., the dropping of the select out signal of the initiating unit. The fall of deselect is illustrated by decision block 212. The flow then returns to FIG. 4.

If a unit requires the poll (block 200 of FIG. 4) and it does not have the poll (block 214) and select out is down (block 216), the unit desiring the poll raises poll request, block 218. If an urgent condition is indicated as illustrated by block 217, the unit raises urgent poll request. In either event, the following sequence is the same.

When the unit receives the signal on its select in line, block 220, it accepts the poll by dropping poll request 222 and raising deselect 244 within 80 nanoseconds of the rise of its select in line. The unit has the poll at the rise of deselect. While completing the poll sequence, the accepting unit may initiate a control transfer sequence and may not pass the poll at this point since the polling sequence is incomplete.

The initiating unit drops its select out signal within 80 nanoseconds of the rise of deselect and this is reflected at the receiving unit by the fall of select in (block 226). The requesting unit then drops its deselect line 228 and the flow proceeds to block 230.

At block 230, the decision is made as to whether or not the next sequence is a priority interruption or a response to a signal processor instruction. In the first case, the flow proceeds to block 231 wherein a control transfer sequence is initiated to perform the priority interruption.

In the second case, the flow proceeds to block 233 wherein a control transfer sequence initiated by a signal processor instruction is performed. These two control transfer sequences are more fully described in Section 5.4.2 of the above identified Moore et al. application.

Referring again to FIG. 5, at decision block 202, when a poll request is received by a unit which does not have the poll (decision block 204), the poll is passed along to the next unit in line. Thus, when the unit receives a signal on select in, block 232, it passes the poll by raising its select out line 234 within 80 nanoseconds of the rise of select in.

The initiating unit drops its select out signal which is reflected as a drop of select in at the requesting unit, block 236. The unit the completes the sequence by dropping select out at block 238 and the flow reverts back to FIG. 4.

Referring again to FIG. 4, if a unit has the poll (block 214) the flow proceeds to block 213 in which a decision is made as to whether or not the unit having the poll also has an urgent need to retain it. If yes, the flow proceeds as previously described. If no, the logic then tests to see if urgent poll request is up at block 215. If yes, then the unit having the poll allows itself to be interrupted and passes the poll to the requesting unit as described with respect to FIG. 5.

SUMMARY

Whenever a unit having the poll has completed the polling sequence, and is not involved in any control transfer sequence and no reset sequence is in progress, it may:

- initiate a control transfer sequence;
- pass the poll; or
- hold the poll until polling request or urgent polling request rises.

In some circumstances, no unit down the line accepts the poll when it is passed. If the poll is not accepted, the select out signal is returned to the initiating unit where select in rises in response thereto. The initiating unit then requests resets select out and the pulling sequence is complete 80 nanoseconds after the fall of the initiating unit's select in.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A polling mechanism for selectively establishing communication between ones of a plurality of units including at least a first unit and a second unit forming interconnected data handling systems, comprising:

- a select line interconnecting said units;
- control logic at each unit in seriatim with said select line;
- a deselect line and a polling request line interconnecting said control logic at each of said units in parallel;
- means in the control logic of said first unit for passing poll control from said first unit to said second unit including means for energizing said select line in response to a signal on said polling request line from a requesting unit; and
- means in the control logic of said second unit responsive to said select line for accepting said poll control by energizing said deselect line.

2. The combination according to claim 1 further including means in said control logic at a unit for energizing said polling request line upon the condition that said unit wishes to acquire poll control.

3. The combination according to claim 1 further including an urgent polling request line interconnecting said units and means in said control logic of said first unit for energizing said urgent polling request line when an urgent condition exists and means in said second unit responsive to energization of said urgent polling request line by said first unit for passing the poll to said first unit provided said urgent condition does not exist in said second unit.

4. A communication interface in which units attached thereto have the same priority with request to each other including a polling mechanism which is not supervised or controlled by any one unit all of the time, comprising:

- a select out line at each unit;
- a select in line at each unit;
- means connecting the select out line of one unit to the select in line of the next unit and the select out line from the last unit to the select in line of the first unit;
- a deselect line interconnecting all said units in parallel; and
- interface logic means at one unit for selectively either energizing said select out line to thereby pass the poll from said one unit to the next unit or energizing said deselect line to thereby accept the poll from a previous unit.

5. A communication mechanism for establishing communication between one subsystem and another subsystem in a data handling system comprised of a plurality of subsystems which comprises:

- control logic in each subsystem;
- a select in input to said logic;
- a select out output from said logic;
- a deselect output from said logic;
- means interconnecting said deselect output of said units;
- means for connecting in series said select lines by connecting select out to select in of the next successive unit;
- means in said control logic responsive to energization of said select in line for selectively:
  1. raising deselect to cause said unit to become a master unit; and
  2. raising select out to cause said unit to remain a slave unit.

6. The combination according to claim 5 further including a poll request line from said logic,

- means interconnecting said poll request lines of said units,
- means in said logic for energizing said poll request line to request the poll from another of said units and, means in said logic responsive to said poll request line to pass the poll to a requesting unit by raising select out.

7. The combination according to claim 6 further including an urgent polling request line from said logic, means interconnecting said urgent polling request lines of said units and means in said logic for energizing said urgent polling request line in response to an urgent condition at said unit and means in said logic responsive to energization of said urgent polling request line to pass the poll to the requesting unit by raising select out provided that an urgent condition does not exist in the passing unit.

* * * * *